(12) United States Patent
Chonan et al.

(10) Patent No.: US 6,367,445 B1
(45) Date of Patent: Apr. 9, 2002

(54) ENGINE CONTROLLER

(75) Inventors: Mitsugi Chonan; Jun Nishimori, both of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,143

(22) Filed: Jun. 21, 2000

(30) Foreign Application Priority Data

Jun. 24, 1999 (JP) .......................................... 11-178217

(51) Int. Cl.[7] .................................................. F02P 9/00
(52) U.S. Cl. ....................................... 123/335; 123/333
(58) Field of Search ................................ 123/333, 335, 123/376

(56) References Cited

U.S. PATENT DOCUMENTS

| | | | | |
|---|---|---|---|---|
| 4,455,978 A | * | 6/1984 | Atago et al. ................. | 123/339 |
| 4,532,901 A | * | 8/1985 | Sturdy ......................... | 123/333 |
| 4,594,980 A | * | 6/1986 | Detweiler .................... | 123/376 |
| 5,048,481 A | * | 9/1991 | Chan et al. .................. | 123/333 |
| 5,755,200 A | * | 5/1998 | Henderson ................... | 123/373 |

* cited by examiner

*Primary Examiner*—Bibhu Mohanty
(74) *Attorney, Agent, or Firm*—Martin A. Farber

(57) ABSTRACT

There is provided an engine controller that prevents the engine operation from being continued due to a throttle valve recovery failure. When a throttle lever is in the unoperated state and the engine revolution higher than a set revolution has remained for a set duration, the engine controller decides that the recovery failure of a throttle valve has occurred and performs a control to stop the operation of the engine. This prevents the engine operation from being continued against the will of the operator in the event that the throttle valve fails to recover. When the engine is used as a motor of a vehicle, for example, the running of the vehicle can be stopped, thus assuring a higher safety.

3 Claims, 3 Drawing Sheets

ENGINE CONTROLLER

BACKGROUND OF THE INVENTION

1. Field of the Invention

The present invention relates to an engine controller and more particularly to an engine controller which controls an engine revolution by operating a throttle lever linked to a throttle valve.

2. Description of the Related Art

An engine that has conventionally been used as a motor for vehicles such as snowmobiles has a throttle lever to adjust the engine revolution. The throttle lever is connected through a throttle wire to a throttle valve installed in an air intake passage. An oscillating action of the throttle lever causes the throttle valve to rotate to increase or reduce an open area in the intake passage, adjusting the amount of air intake into the engine and therefore the engine revolution.

The engine with the above construction has a possibility of a so-called throttle valve recovery failure, a trouble caused by snow which, after adhering to a throttle shaft and others supporting the throttle valve, freezes to hold the throttle valve immovable in an open state while the snowmobile is traveling over snow. Once the throttle valve recovery failure occurs, the engine revolution remains high and cannot be lowered by the operation of the throttle lever, making normal traveling impossible.

To prevent this, conventional practice takes advantage of the fact that releasing the throttle lever when the throttle valve fails to recover causes the throttle wire to slacken. This slack of the throttle wire is checked. When the throttle wire is detected to be slack, it is decided that the throttle valve recovery failure occurs and a control is performed to stop the engine.

In recent years, snowmobiles for child use are being manufactured. Child snowmobiles have a governor in the engine to limit the maximum engine revolution and therefore the maximum speed to a moderate level.

FIG. 3 is a side view of an engine equipped with a governor. An engine 1 has a governor (not shown) in a crankcase and a governor shaft 2 of the governor projects from the side of the engine 1.

The governor shaft 2 can rotate through a predetermined range of angle, and a governor mechanism narrows the rotatable range of angle as the engine revolution increases. The governor shaft 2 is securely attached with a base end of a governor lever 3. The governor lever 3 extends vertically along the side surface of the engine 1. As the governor shaft 2 pivots, the front end of the governor lever 3 oscillates left and right, with its oscillation range being narrowed in a direction away from a carburetor 11 described later (toward left in FIG. 3) as the engine revolution rises.

The governor lever 3 is connected through a governor spring 6 to a speed control lever 5 provided on an extension of the governor lever oscillation direction. The governor spring 6 urges the governor lever 3 and the speed control lever 5 toward each other.

The speed control lever 5 is rotatably mounted on the engine 1 so that it can oscillate the governor lever 3. The speed control lever 5 is attached with one end of the throttle wire 7 so that it can be oscillated.

The other end of the throttle wire 7 is secured to a throttle lever not shown, which is structured to be able to pull the throttle wire by its oscillation operation.

Hence, the oscillation operation of the throttle lever pulls the throttle wire 7, which oscillates the speed control lever 5 to pull the governor spring 6 causing the governor lever 3 to oscillate toward the carburetor 11.

The governor lever 3 is connected through a governor rod 10 to the carburetor 11 installed below the speed control lever 5. The governor rod 10 extends parallel to the governor spring 6, with one end thereof connected to the governor lever 3 and the other end to a throttle arm 15 of the carburetor 11.

The throttle arm 15 is secured to the upper end of a throttle shaft 13 pivotally supported on the carburetor 11. The throttle arm 15 is connected with the governor rod 10 at a point offset from the axis center of the throttle shaft 13. The throttle shaft 13 is securely attached with a throttle valve 12 and is urged at all times by an urging means not shown to pivot in a direction that will reduce the opening area of an intake passage 14.

When the governor lever 3 is oscillated toward the carburetor 11 by the oscillating action of the speed control lever 5, the governor rod 10 pivots the throttle arm 15 in a direction that will cause the throttle valve 12 to expand the opening area of the intake passage 14. When the governor lever 3 is oscillated away from the carburetor 11, the governor rod 10 pivots the throttle arm 15 in a direction that will cause the throttle valve 12 to reduce the opening area of the intake passage 14.

Hence, as the governor lever 3 is oscillated toward the carburetor 11 by the oscillating action of the throttle lever, the throttle arm 15 is pivoted causing the throttle valve 12 to rotate in a direction that will expand the opening area of the intake passage 14.

When the throttle lever is rendered unoperated, the throttle wire 7 is returned, eliminating the force that has rotated the throttle valve 12 against the urging force of the urging means of the throttle shaft 13, with the result that the throttle valve 12 is pivoted in a direction that will reduce the opening area. This in turn pivots the throttle arm 15, oscillating the governor lever 3 away from the carburetor 11.

The range of oscillation of the governor lever 3 is narrowed by the governor in a direction away from the carburetor 11 as the engine revolution increases, so that the pivoting motion of the throttle valve 12 in a direction that increases the opening area is limited as the engine revolution speed increases.

If an attempt is made to oscillate the throttle lever to cause the governor lever 3 to oscillate out of the narrowed oscillation range toward the carburetor 11, the governor spring 6 is extended elongating the distance between the governor lever 3 and the speed control lever 5.

Hence, the governor lever 3 is prevented from being oscillated out of the narrowed oscillation range toward the carburetor 11, with only the throttle lever and the speed control lever 5 oscillated. Thus, the throttle valve 12 increases or reduces the opening area within the narrowed oscillation range of the governor lever 3.

In the case described above, because the governor spring 6 is disposed between the speed control lever 5 and the governor lever 3 and pulls the throttle wire 7 at all times, the throttle wire 7 will not slacken if the throttle valve 12 fails to recover.

Hence, the conventional method of detecting the slack of the throttle wire cannot detect the throttle valve recovery failure. There is a possibility therefore that the engine revolution may be kept high even when the throttle lever is rendered unoperated, making normal traveling impossible.

SUMMARY OF THE INVENTION

The present invention has been accomplished to overcome the above-described problem and to provide an engine controller that prevents the engine operation from continuing due to the throttle valve recovery failure.

To solve the problem described above, the engine controller of the invention according to a first aspect is characterized in that when a throttle lever is in an unoperated state and an engine revolution higher than a set revolution has been maintained for a set period of time, the engine controller decides that a throttle valve recovery failure has occurred and performs a control to stop the operation of the engine.

With this invention, when the throttle lever is not operated and the engine revolution higher than a set revolution has been maintained for a set period of time, it is decided that a throttle valve recovery failure has occurred for some reason and the operation of the engine is stopped.

Hence it is possible to prevent the operation of the engine from being continued against the will of the operator and, when the engine is used as a motor of a vehicle, for example, to stop the running of the vehicle thus assuring a high level of safety.

The recovery failure of the throttle valve refers to a situation in which the throttle valve remains stuck in an open state even when the throttle lever is not operated.

The invention according to a second aspect is characterized in that the engine controller according to the first aspect comprises: a throttle lever unoperated state detection means to detect whether the throttle lever is in the unoperated state; an engine revolution detection means to detect a revolution of the engine; a throttle valve recovery failure decision means to make a decision on the throttle valve recovery failure based on the detected unoperated state of the throttle lever and the engine revolution; and an engine stop control means to stop the operation of the engine when the throttle valve recovery failure has occurred.

With this invention, when it is decided based on the unoperated state of the throttle lever and the engine revolution that the throttle valve recovery failure has occurred, the engine operation is stopped. Therefore, the invention of claim 1 can be implemented properly and easily.

The invention according to a third aspect is characterized in that the throttle valve recovery failure decision means includes an engine revolution decision means to decide whether, when the throttle lever is in the unoperated state, the engine revolution is in a higher revolution state, which is higher than a set revolution, and a time decision means to decide whether, when the engine revolution is in the high revolution state, the high revolution state has been maintained for a set period of time or more, and in that when the time decision means has decided that the high revolution state has been maintained for the set period of time or more, the throttle valve recovery failure decision means decides that a throttle valve recovery failure has occurred.

With this invention, when the throttle lever is not operated and if the engine revolution is in the high revolution state and the high revolution state has been maintained for a set period of time or more, it is decided that the throttle valve recovery failure has occurred. It is therefore possible to easily determine when the throttle valve fails to recover.

The invention according to a fourth aspect is characterized in that the engine stop control means stops the operation of the engine by an ignition cut for stopping an ignition at a spark plug. With this invention, because the engine operation is stopped by the ignition cut which stops ignition at the spark plug, the engine operation can be stopped easily, reliably and swiftly.

The invention according to a fifth aspect is characterized in that the engine has a governor to adjust an opening of the throttle valve according to the engine revolution, and the throttle lever is connected through the governor to the throttle valve.

With this invention, because the engine has the governor that adjusts the opening of the throttle valve and the throttle lever is connected to the throttle valve through the governor, the opening of the throttle valve can be adjusted irrespective of the operation of the throttle lever.

Hence, although the throttle valve recovery failure cannot be detected by a conventional method based on the slack of the throttle wire, the application of this invention as claimed in the above claims makes it possible to detect the throttle valve recovery failure properly and easily, offering a significant advantage.

DESCRIPTION OF THE PREFERRED EMBODIMENTS

Figure 1:
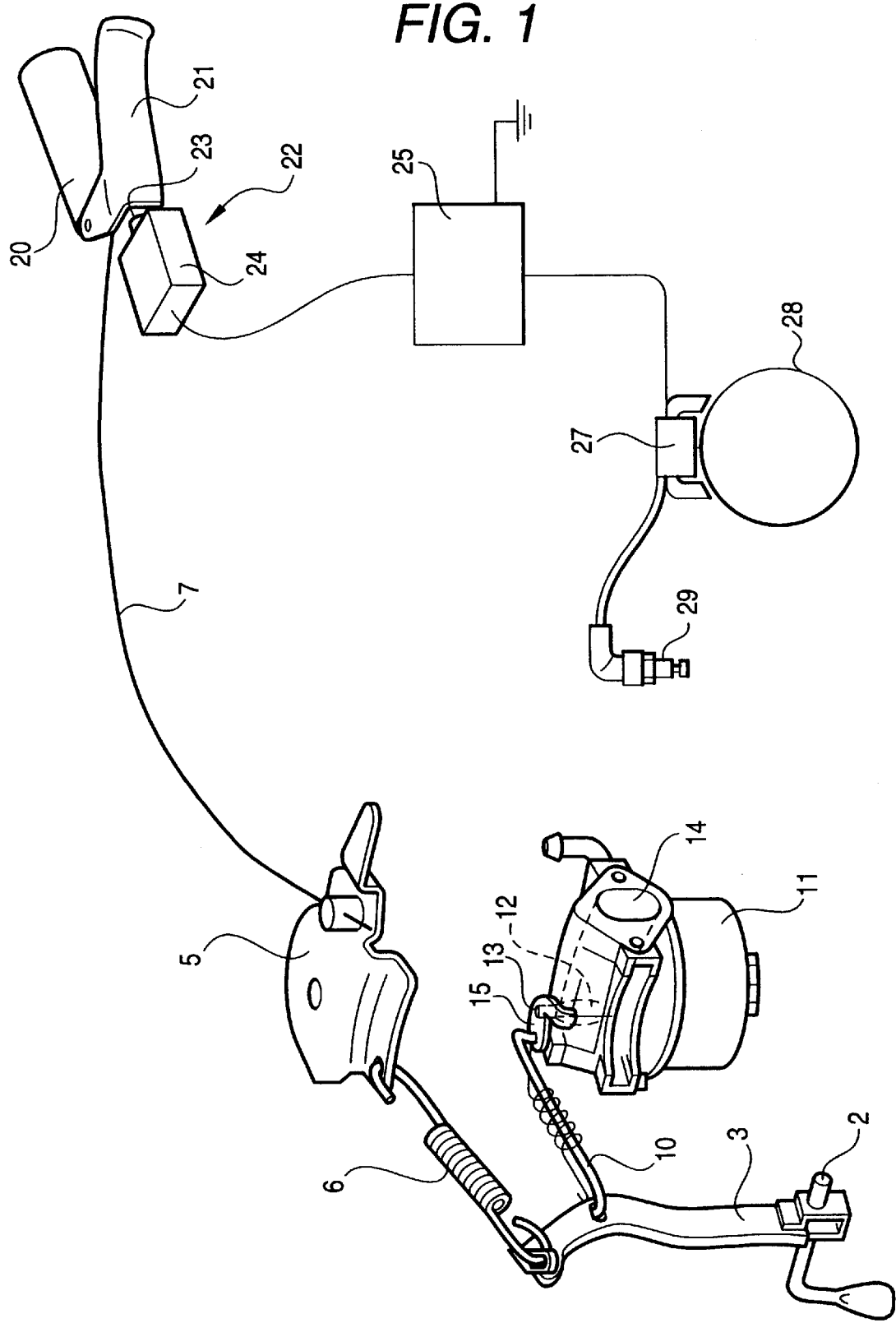
FIG. 1 is an explanatory view showing a concept of one embodiment.
Figure 2:
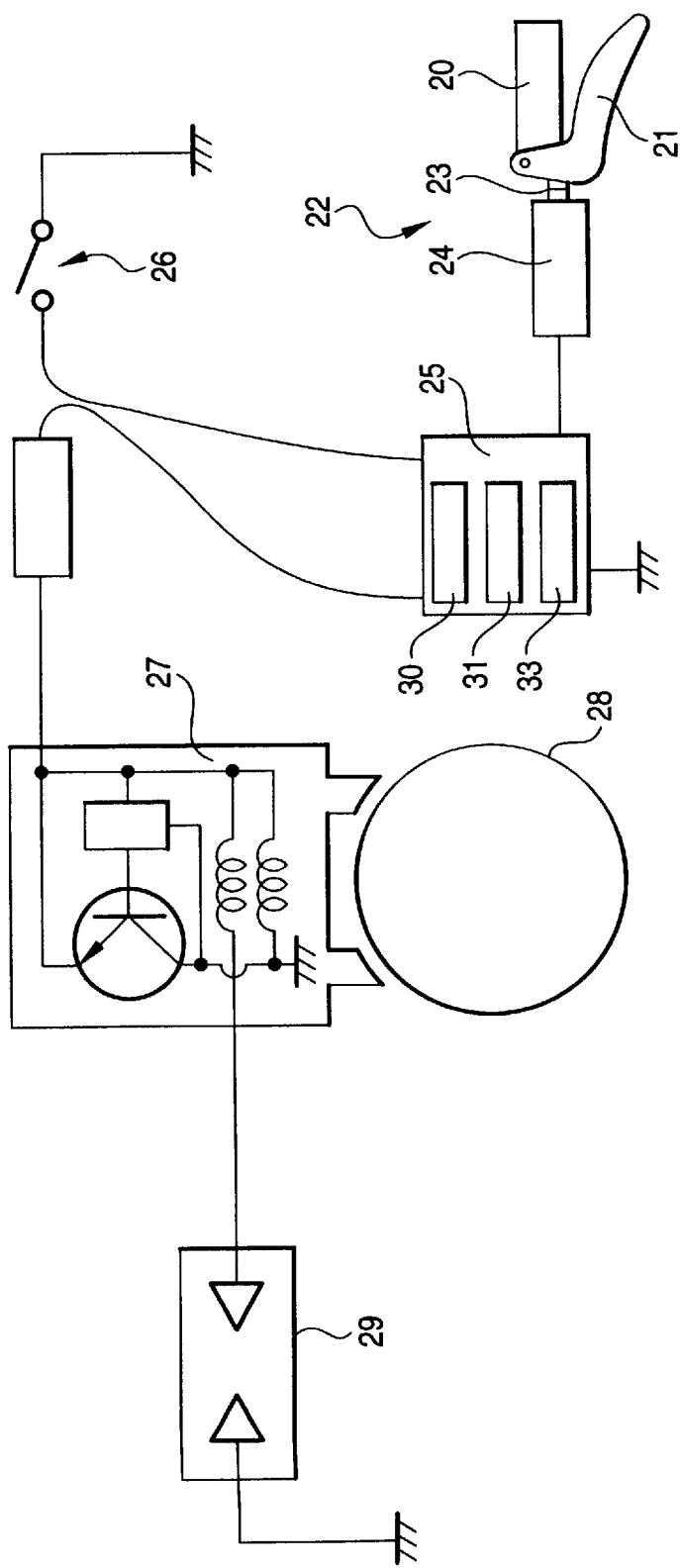
FIG. 2 is an electric circuitry of this embodiment.

Next, an embodiment of the invention will be described by referring to the accompanying drawings. FIG. 1 shows a concept of this embodiment, and FIG. 2 is an electric circuit of the embodiment. Constitutional elements identical with conventional ones are assigned like reference numerals and their detailed descriptions are omitted.

In this embodiment an engine with a governor for a child-use snowmobile will be explained as an example. This engine has its idle revolution set at 1600 rpm, a clutch is automatically engaged at 2000 rpm, and the governor limits the maximum engine revolution to 3600 rpm so that the maximum snowmobile speed is about 13 km/h (8 miles/hour).

Reference number 20 denotes a steering handle of the snowmobile, which has a throttle lever 21 pivotally mounted thereon so that it can be oscillated toward and away from the steering handle 20. The throttle lever 21 is connected with one end of the throttle wire 7, the other end of which is secured to the speed control lever 5.

Near the throttle lever 21 is provided a throttle lever unoperated state detection means 22 to detect the unoperated state of the throttle lever 21. The throttle lever unoperated state detection means 22, as shown in FIG. 2, has a movable member 23 and a case 24. The movable member 23 is urged to project and engage with the throttle lever 21 so that it is moved by the operation of the throttle lever 21. The case 24 movably supports the movable member 23 and accommodates a switching circuit that outputs an ON or OFF electric signal according to the position of the movable member 23.

When the throttle lever 21 is rendered unoperated to push the movable member 23 into the case 24, an ON signal is output. When the throttle lever is oscillated toward the steering handle to cause the movable member 23 to project from the case 24, an OFF signal is output.

The ON or OFF signal output from the throttle lever unoperated state detection means 22 is entered into an ignition cut unit 25, which, as shown in FIG. 2, is connected to a stop switch 26 and an ignition coil 27 as well as the throttle lever unoperated state detection means 22.

Figure 3:
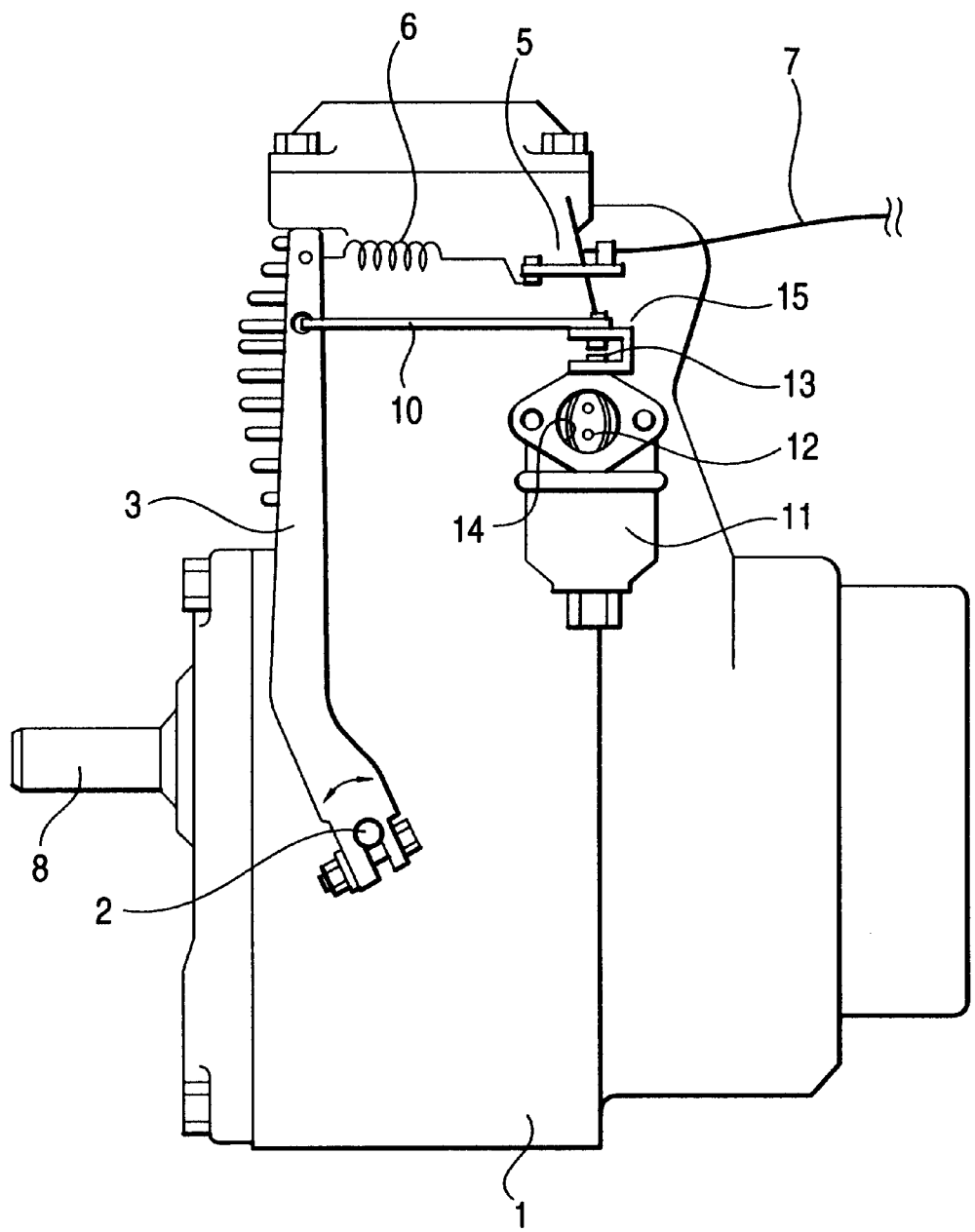
FIG. 3 is a side view of an engine equipped with a governor.

The stop switch 26 is operated to cut off the electric system to stop the engine. The ignition coil 27 generates electricity by the rotation of a rotor 28 directly connected to a crank shaft 8 (see FIG. 3) of the engine 1 to generate an ignition park at a predetermined timing by a spark plug 29 connected thereto through a plug cord.

The ignition cut unit 25 has as its internal mechanism a throttle valve recovery failure decision means 30 to check for a recovery failure of the throttle valve 12, an engine stop control means 31 to automatically stop the engine when it is decided that the throttle valve 12 has failed to recover, and an engine revolution detection means 32 to detect an engine revolution based on a signal from the ignition coil 27.

The throttle valve recovery failure decision means 30 has an engine revolution decision means to check whether, when the throttle lever 21 is rendered unoperated, the engine revolution is in a high revolution state which is higher than a set revolution, and a time decision means to check whether, when the engine revolution is in the high revolution state, the high revolution state has continued for more than a set period of time. Based on the decisions made by these means, the recovery failure of the throttle valve 12 is checked. The engine stop control means 31, upon receiving the throttle valve recovery failure decision, executes the control to stop an ignition operation performed by the spark plug 29.

Next, the engine control performed by the ignition cut unit 25 will be explained. First, while the engine is running, it is checked whether the ON signal is input from the throttle lever unoperated state detection means 22. If the ON signal is input, it is decided that the throttle lever 21 is not operated. Then, a check is made to see whether the recovery failure of the throttle valve 12 has occurred.

The decision on the recovery failure of the throttle valve 12 is made by checking whether the engine revolution has been more than a set revolution for a set period of time while the throttle lever 21 is in the unoperated state. In this embodiment, a setting is made such that the throttle valve recovery failure is determined when the engine revolution at more than 2200 rpm has continued for 3 seconds or more.

When it is decided that the throttle valve 12 has failed to recover, the engine stop control means 31 stops ignition. The ignition is stopped by applying the current generated by the ignition coil 27 directly to ground, not to the spark plug 29. As a result, the spark plug 29 does not generate a spark, stopping the engine 1.

When, for example, snow adhering to the throttle shaft 13 of the carburetor 11 freezes causing the recovery failure of the throttle valve 12 while the snowmobile is traveling over snow and if the throttle lever 21 is rendered unoperated and the engine revolution higher than a set revolution has continued for a set period of time, the engine control described above stops the ignition and therefore the engine.

Especially in engines like the one described above that use a governor mechanism, the recovery failure of the throttle valve 12 is difficult to detect with a conventional method based on the slack of the throttle wire 7 because the throttle wire 7 is always pulled tense by the governor spring 6. With this invention, however, because the unoperated state of the throttle lever 21 is directly detected and the factors such as engine revolution are used, it is easy to determine the recovery failure of the throttle valve 12 and its advantage is significant.

Therefore, in the event of a recovery failure of the throttle valve 12, the engine operation can be prevented from continuing against the will of an operator and, when the engine is used as a motor of a vehicle, the vehicle can be stopped from running, thus assuring a higher safety.

While in this embodiment the child snowmobile has been described as an example, the invention can also be applied to other vehicles including ATVs such as buggy cars having a governor that limits the maximum speed.

As described above, the engine controller of this invention performs a control to stop the engine when the throttle lever is in an unoperated state and the engine revolution higher than a set revolution has been maintained for a set period of time. Thus, in the event of a throttle valve recovery failure, the engine operation is reliably and swiftly stopped. It is therefore possible to prevent the engine operation from being continued against the will of the operator and, when the engine is used as a motor of a vehicle, stop the running of the vehicle.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A controller for an engine manipulated by a throttle lever, comprising:

throttle lever inoperative state detection means for detecting whether said throttle lever is in an inoperative state;

engine revolution detection means for detecting a revolution of said engine;

throttle valve recovery failure decision means for judging that a throttle valve recovery has failed during a predetermined time period during which said detected engine revolution is higher than a set engine revolution in said inoperative state; and engine stop control means for stopping said engine when said throttle valve recovery failure decision means judges that said throttle valve recovery has failed.

2. An engine controller according to claim 1, wherein the engine stop control means stops the operation of the engine by an ignition cut for stopping an ignition at a spark plug.

3. An engine controller according to claim 1, wherein the engine has a governor to adjust an opening of the throttle valve according to the engine revolution, and the throttle lever is connected through the governor to the throttle valve.

\* \* \* \* \*